Feb. 12, 1929. 1,701,557

D. CLINCH ET AL

SCHOOL GAME

Filed June 8, 1927

Fig. 1.

| Who is the little girl? |
| Why is she running away? |
| Who has frightened her? |
| What has she in her hand? |
| What is dropping from her hand? |
| Where is she going? |
| What color is her dress? |
| What has she over her dress? |
| Did she spill her milk? |

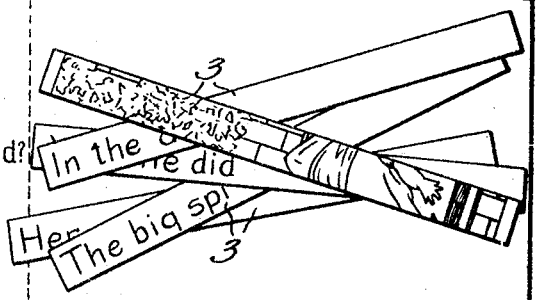

Fig. 2.

| Who is the little girl? | She is little Miss Muffet. |
| Why is she running away? | Because she is frightened. |
| Who has frightened her? | The big spider. |
| What has she in her hand? | She has a bowl in her hand. |
| What is dropping from her hand? | Her spoon. |
| Where is she going? | In the door. |
| What color is her dress? | Her dress is red. |
| What has she over her dress? | A little white apron. |
| Did she spill her milk? | Yes she did. |

Fig. 3

 

Fig. 4.

INVENTORS
Worthy Clinch
Antoinette Blache
BY Knight Bro.
ATTORNEYS

Patented Feb. 12, 1929.

1,701,557

UNITED STATES PATENT OFFICE.

DOROTHY CLINCH AND ANTOINETTE BLACHE, OF ENGLEWOOD, NEW JERSEY, ASSIGNORS TO THE W. F. POWERS COMPANY, OF NEW YORK, N. Y., A CORPORATION OF NEW YORK.

SCHOOL GAME.

Application filed June 8, 1927. Serial No. 197,345.

The invention relates to self-corrective educational toys for use in school whereby the scholars may not only work out problems but check up and correct the solutions.

The toy comprises as its essential features, a set of loose pieces of card board or the like, that form the parts of a picture puzzle, which are to be assembled, picture side down, according to a dictated relationship between matter printed on the backs of the loose pieces and a set of propositions referring thereto. The propositions that indicate where the loose cards are to be placed are printed on a separate card and may indicate by their own relative positions the order in which the loose cards are to be placed, each response card being placed, for example, adjacent the proposition to which it responds, or the loose cards may be placed according to instructions given in the propositions and have no relation to the order in which the propositions are stated. The propositions may be made with reference to a sample picture which may be a duplicate of the puzzle picture that is to be assembled.

A further feature of the invention comprises a cardboard folder, on one leaf of which the loose pieces are to be assembled so that the loose pieces may be turned over without disturbing their assembled relationship.

An embodiment of the invention described herein comprises a combination of a sample picture, a card or folder having a set of questions or instructions relating to the picture, a number of loose cards or pieces which carry sections of the picture on one side and appropriate responses to the questions or instructions on the other side, one such response to each loose card. The game is played by placing the loose cards in the manner indicated by the set of questions or instructions with the answer side up. Upon then turning the cards over without disturbing their relative positions, the picture formed by the assembled cards will show what, if any, of the questions have been improperly answered because the assembled picture should everywhere correspond with the sample picture. The players can thus make their own corrections. In the particular case where the game is played by assembling the loose cards with the answers corresponding to a certain order in which the questions are arranged, we prefer to have the questions printed on one leaf of an open folder while the loose cards are placed on the other leaf. When the cards are all placed, the folder, by being closed on the loose cards, may then be turned over and when again opened, will display the cards with their picture side up. The loose cards, which together make up the picture may be, when not in use, held in a suitable case or envelope attached to the back of the folder.

A particular form of the invention is illustrated in the accompanying drawings, in which Figure 1 is a view of the inside of the plain folder with the answer cards on the spare leaf.

Figure 2 is a similar view but with the answer cards properly placed on the spare leaf.

Figure 3 is a view of the inside of the folder after the folder has been folded and again unfolded so as to bring the picture side of the cards up. The sample picture is shown lying on the spare leaf of the folder.

Figure 4 is a longitudinal section through the folder and attached pocket.

Referring to the drawings, the numeral 1 indicates, for example, a cardboard folder adapted to be folded on the dotted line. On the left hand leaf of the folder is printed a column of questions. Instead of the questions, a series if instructions relating to the placing of the loose cards may be used. At 2 (see Figure 3) is shown a picture on a separate card to which the questions or instructions refer. A number of loose cards 3 are provided, and each of these loose cards has printed on one side an answer to one of the questions, while on the other side is a section of the picture. Using the picture 2 as a guide, the loose cards may therefore be assembled as shown in Figure 2 on the right hand leaf of the folder with the appropriate answer adjacent its corresponding question. The other sides of the loose cards form a picture puzzle, and when the left hand of the folder is folded over the right hand and then turned over and unfolded, the picture will appear as properly assembled if the the questions have all been answered correctly.

If the answers have not been properly arranged, the picture will not appear as properly assembled, and the player will immediately see where the mistake was made. The example given shows questions of very elementary nature, but it is evident that questionnaires suitable to all degrees of intelligence may be used.

On the back of the folder is secured an envelope or pocket 4 (see Figure 4) with a closing flap 5 to provide means for holding the loose cards when not in use. While the loose cards have been shown as horizontal strips to be placed in a column corresponding to the column of questions, it is evident that many other arrangements of questions and loose cards may be designed as long as the result is obtained of enabling the players to see for themselves what corrections, if any, are indicated by comparison of the assembled picture with the sample picture. The use of a folder presents the most convenient method of playing the game, but the folder is not a necessary element of the invention.

We claim:—

1. In a device of the character described, the combination comprising a sample picture, a card having a number of questions relating to the picture printed thereon, loose cards corresponding in number to the questions, each loose card having upon one side an answer to one of the questions, and upon the other side a section of the picture such that when the loose cards are placed with their answers opposite their appropriate questions in proper order, the assembled sections of the picture will appear in their proper places as indicated by the sample picture.

2. In a device of the character described, the combination comprising a sample picture, a folder having two leaves, one of the leaves having a column of questions printed thereon referring to the picture, a number of loose cards, each card having upon one side an answer to one of the questions and upon the other side a section of the picture so that when the loose cards are placed with their answers adjacent their appropriate questions the sections of the picture may be made to appear in their proper places when the folder is closed and opened.

DOROTHY CLINCH.
ANTOINETTE BLACHE.